(12) United States Patent
Okada et al.

(10) Patent No.: US 7,778,775 B2
(45) Date of Patent: Aug. 17, 2010

(54) POSITION DETECTING APPARATUS AND METHOD OF DETECTING A POSITION

(75) Inventors: Kunio Okada, Iruma (JP); Shimpei Matsuda, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 734 days.

(21) Appl. No.: 11/803,321

(22) Filed: May 14, 2007

(65) Prior Publication Data

US 2007/0219719 A1 Sep. 20, 2007

(30) Foreign Application Priority Data

May 16, 2006 (JP) .............................. 2006-135929
Jun. 21, 2006 (JP) .............................. 2006-170811

(51) Int. Cl.
*G01C 21/00* (2006.01)
*G01S 5/14* (2006.01)

(52) U.S. Cl. .................. 701/213; 701/207; 342/357.12

(58) Field of Classification Search ................. 701/213, 701/214, 207; 342/357.06, 357.12, 358
See application file for complete search history.

(56) References Cited

U.S. PATENT DOCUMENTS 5,119,102 A * 6/1992 Barnard .................. 342/357.09
5,148,452 A * 9/1992 Kennedy et al. ............. 375/343
5,434,787 A * 7/1995 Okamoto et al. ............. 701/214
5,801,659 A * 9/1998 Helfrick ................. 342/357.08
6,380,891 B1 4/2002 Yamashita

FOREIGN PATENT DOCUMENTS

| JP | 3-42793 B2 | 6/1991 |
| JP | 11-304899 A | 11/1999 |
| JP | 2000-292521 A | 10/2000 |
| JP | 2003-194910 A | 7/2003 |

\* cited by examiner

*Primary Examiner*—Tan Q Nguyen
(74) *Attorney, Agent, or Firm*—Frishauf, Holtz, Goodman & Chick, P.C.

(57) ABSTRACT

CPU instructs RF controlling section to switch RF section from an inoperative mode to an operation mode and from the operation mode to the inoperative mode. When all of five pieces of sub-frame data have not been acquired, RF section is switched intermittently from the inoperative mode to the operation mode in synchronization with transmission of lacking sub-frame data, thereby acquiring such lacking sub-frame data. When all the five pieces of sub-frame data have been acquired, the current position is calculated using positional information contained in the sub-frame data. A part of five pieces of sub-frame data including the first to fifth sub-frame data transmitted from a satellite in a time series manner is acquired from GPS signal received in the operation mode, and the remaining part of the five pieces of sub-frame data is acquired in operation mode set at other timing, and then the positional information is judged based on the five pieces of sub-frame data acquired in the above manner.

18 Claims, 14 Drawing Sheets

EPHEMERIS | ALMANAC
SUB-FRAME 1 | SUB-FRAME 2 | SUB-FRAME 3 | SUB-FRAME 4 | SUB-FRAME 5

MAIN FRAME (30 SECONDS)

| | | | |
|---|---|---|---|
| 1 | TLM | HOW | CLK, Svhealth, arruracy |
| 2 | TLM | HOW | ORBIT INFORMATION, EPHEMERIS |
| 3 | TLM | HOW | ORBIT INFORMATION, EPHEMERIS |
| 4 | TLM | HOW | ALMANAC, MODIFIED IONOSPHERE INFORMATION |
| 5 | TLM | HOW | ALMANAC, MODIFIED IONOSPHERE INFORMATION |

SUB-FRAME (6 SECONDS)

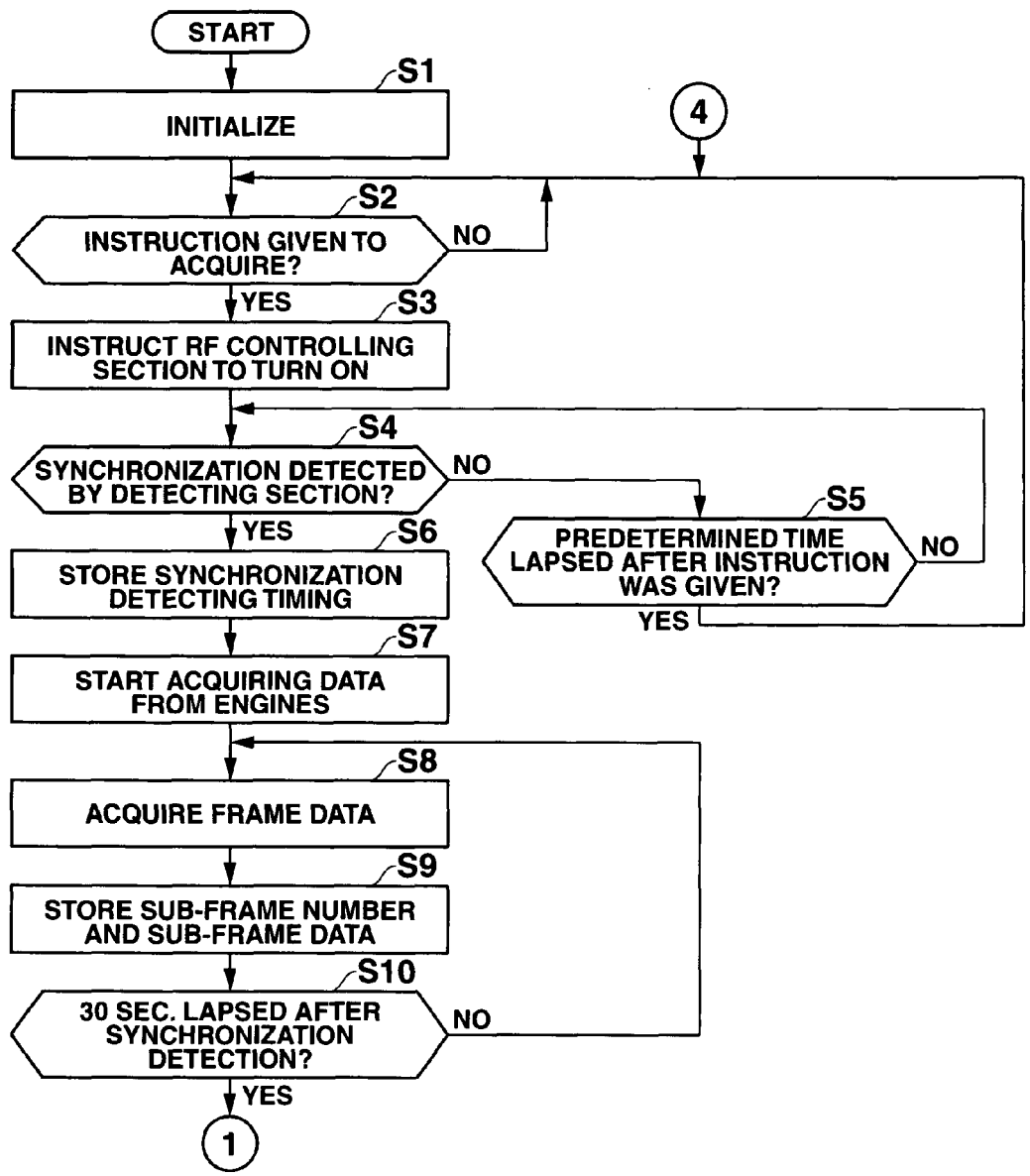

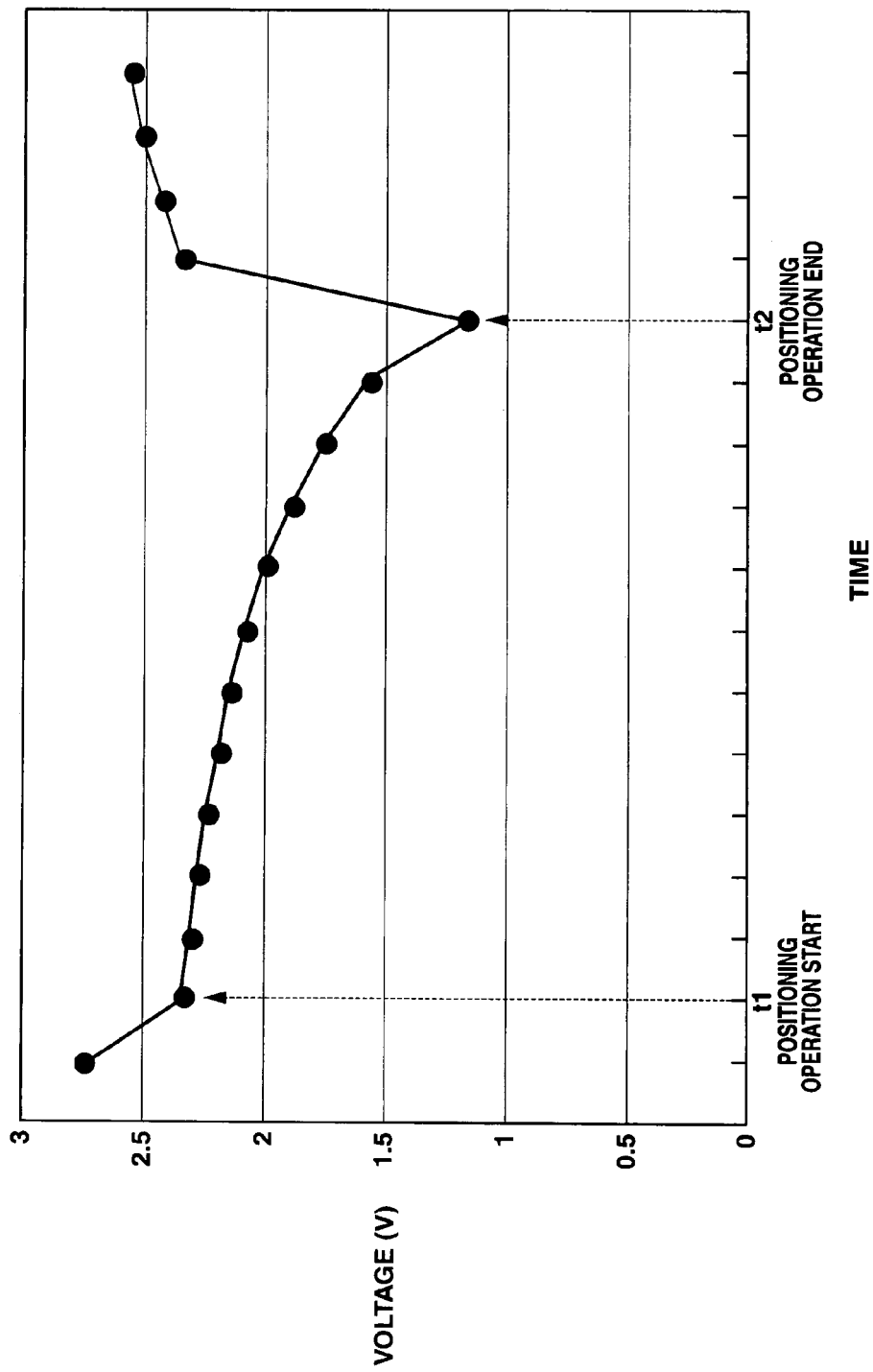

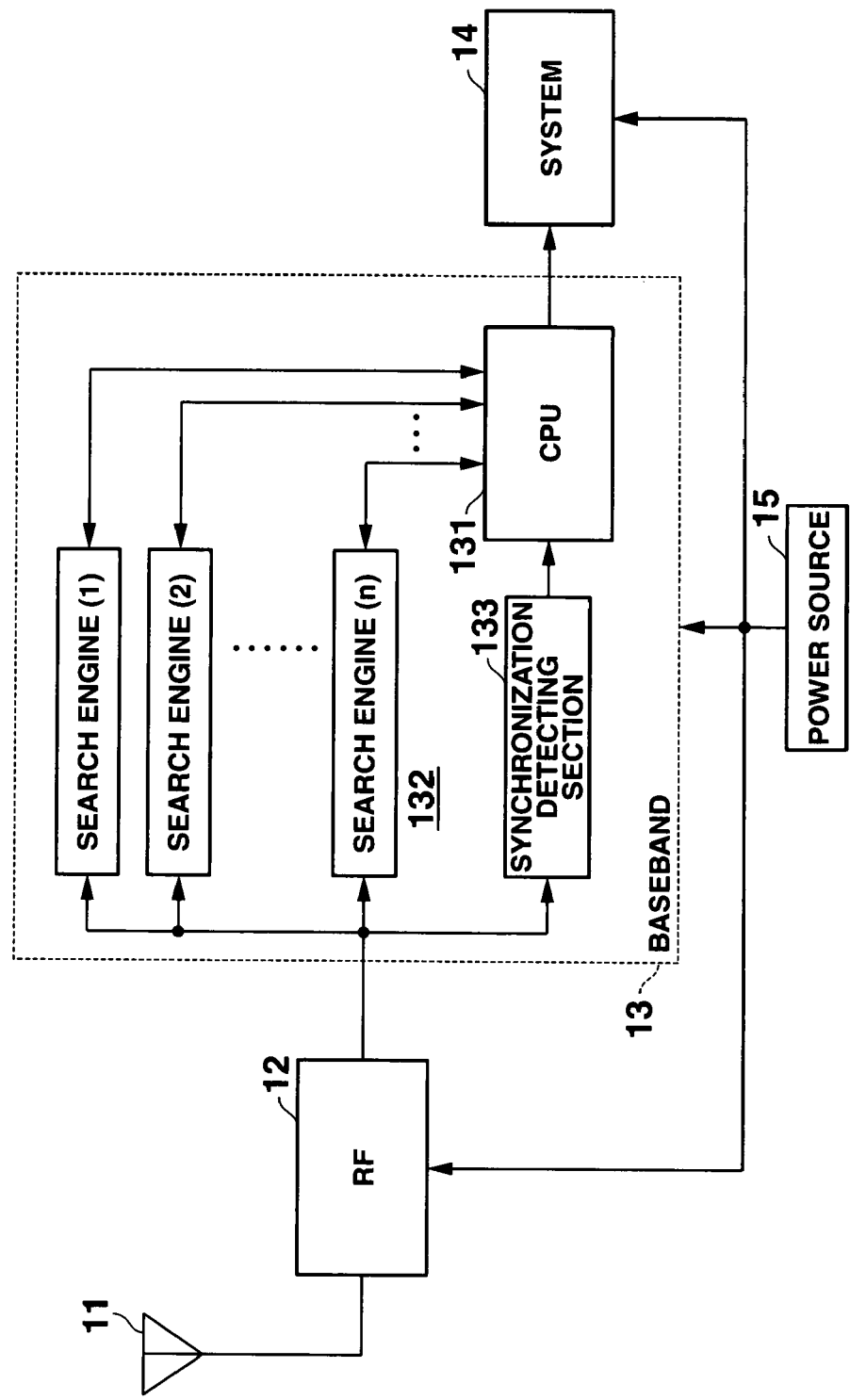

POSITION DETECTING APPARATUS AND METHOD OF DETECTING A POSITION

CROSS-REFERENCE TO RELATED APPLICATIONS

This application is based on and claims the benefit of priority from the prior Japanese Patent Application No. 2006-135929, filed May 16, 2006 and No. 2006-170811, filed Jun. 21, 2001, the entire contents of which are incorporated herein by reference.

BACKGROUND OF THE INVENTION

1. Field of the Invention

The present invention relates to a position detecting apparatus and a method of detecting a position, and more particularly to a position detecting apparatus and a method of detecting a position, which receive electromagnetic waves from plural satellites and calculate a current position of the apparatus using information detected from the received electromagnetic waves.

2. Description of the Related Art

GPS (Global Positioning System) is a system, which receives electromagnetic waves from plural satellites, and calculates the current position using information included in the received electromagnetic waves. The satellites used for the system are not stationary satellites but 32 mobile satellites are used, which orbit the earth at an altitude of 20,000 kilometers and change constantly their relative positions to the earth. To detect the current position, it is necessary to receive GPS signals at least from three satellites among 32 satellites. In practice, GPS signals are received from four satellites to calculate the current position. Each satellite transmits a signal including main frames each having a 30 second period. The main frame consists of five sub-frames each having a 6 second period. Each sub-frame includes data of 30 bits. The first sub-frame among the five sub-frames (first sub-frame to fifth sub-frame) stores a clock correction coefficient and data representing a satellite state, and the second sub-frame and third sub-frame store "Ephemeris" or orbit information. The fourth sub-frame and fifth sub-frame store "Almanac" or general orbit information common to all the 32 satellites. FIG. 14 is a block diagram illustrating a circuit configuration of a conventional position detecting apparatus using a wristwatch. The position detecting apparatus comprises an antenna 11, RF section 12, base band processing section 13, system section 14 and a power source 15.

RF section 12 receives GPS signals from satellites through the antenna 11, and demodulates the received GPS signal, thereby obtaining a base band signal, and supplies the base band signal to the base band processing section 13. The base band processing section 13 comprises CPU 131, "n" units of search engines 132, synchronization detecting section 133. The synchronization detecting section 133 detects synchronizing signals (hereinafter, refer to as "preamble") of 8 bits each included at the leading portion of each sub-frame, and inputs the starting timings of the sub-frames into CPU 131. CPU 131 starts up the "n" units of search engines 132 based on the preambles detected by the synchronization detecting section 133. Each search engine acquires one sub-frame and stores data of the sub-frame. In the case where GPS signals are received from four satellites and used to detect the current position, data of five continuous sub-frames which are simultaneously transmitted from the four satellites are successively stored in the five search engines, and these 20 pieces of data in total stored in the search engines are used to calculate the current position. The system section 14 comprises, for example, a time counting device, and displays the current position calculated by the base band processing section 13. The power source 15 comprises, for instance, a small sized battery of a coin type (for example, Battery type 2016) and DC/DC converter, and supplies power to RF section 12, the base band processing section 13 and the system section 14.

With respect to technology for using GPS to detect a position, there have been various proposals.

For example, in a GPS navigation apparatus disclosed in Japanese Patent Publication No. Hei3-42793, Ephemeris data is divided into and collected in the unit of sub-frame, and stored in a memory, thereby reducing a time required for collecting data. More specifically, a flag for collecting sub-frames is provided, and the flag is set to "1" every time a sub-frame is collected. Therefore, it is judged based on the flag whether a sub-frame is one which is collected before, and therefore there is no need to collect the same sub-frame repeatedly, resulting in a short time for collecting sub-frames.

A GPS receiving apparatus disclosed in Japanese Patent unexamined Publication No. Hei 11-304899 comprises a detecting section provided with plural channels, message collecting section for collecting navigation information of satellites demodulated by the detecting section, message analyzing section for analyzing the collected massages, positioning section for calculating a position of a receiver from transmission times and distances from satellites, and a timing specifying section for specifying a timing for the message collecting section to scan a navigation message. When messages are collected through one and more channels, the timing specifying section specifies a timing for other channel. GPS navigation apparatus detects fast a preamble pattern or a bit pattern indicating the head portion of a navigation message transmitted from GPS satellite in order to reduce a time required for all the channels to acquire the preamble patterns, and quickly gathers navigation messages to reduce an idle time, during which no positing operation is executed.

A GPS receiving apparatus disclosed in Japanese Patent unexamined Publication No. 2000-292521, plural channels can acquire GPS satellites respectively, and time information is abstracted from satellite data of the acquired satellites. Distances between the current position of the GPS receiving apparatus and GPS satellites are calculated using the time information and a current time counted by the GPS receiving apparatus. Further, detailed orbit information (Ephemeris) is abstracted from satellite data and positions of the satellites are calculated based on the Ephemeris and the current position of GPS receiving apparatus using the calculated distances. In this way, synchronization with satellite data is established quickly, thereby reducing a time left before the positioning operation starts.

In a position detecting apparatus disclosed in Japanese Patent unexamined Publication No. 2003-194910, data of a satellite received by GPS receiver has a hierarchical structure and is structured in a way such that words are subject to a sub-frame, and further the sub-frames are subject to a main frame. A parity bit for word check is included in a word. GPS receiver executes parity check with respect to every word to judge how many words are no good ("NG") in a sub-frame, and outputs the number of words which are determined as no good "NG". A judging section judges depending on the number of words determined as "NG" whether data receiving condition is proper or not. When it is determined that data receiving condition is not proper, a control section shuts down the power supply not to acquire data, and turns on the power supply to acquire data after a predetermined time has lapsed. In a poor data receiving condition, it takes a long time to acquire data. Therefore, when the power is supplied to acquire satellite orbit information, much power is consumed, but in the above apparatus, useless power consumption can be avoided.

The position detecting apparatus having GPS receiver is arranged to acquire five sub-frames consisting of the first to fifth sub-frame continuously. Since the five sub-frames have a period of 30 seconds, it is necessary to supply the power constantly for more than 40 seconds with some margin given before and after the sub-frame receiving operation. But in the conventional position detecting apparatus using a wrist watch, shown in FIG. 14, and other hand held position detecting apparatus, when a coin type battery is used to supply power to peripheral circuits, and the power is supplied continuously for more than 40 seconds, the discharging characteristic of the battery can be deteriorate, inviting excessive voltage drop, and as a result, the apparatus may be broken down due to such excessive voltage drop of the battery.

The present invention has been made to solve the problems involved in the conventional apparatuses, and has an object to provide a position detecting apparatus using a coin type battery or other small sized battery. The position detecting apparatus does not consume battery power uselessly, and therefore, may not be broken down due remarkable voltage drop of the battery, thereby receiving GPS signals from satellites without failure to detect the current position.

According to one aspect of the present invention, there is provided a position detecting apparatus for receiving GPS signals transmitted from satellites, and for detecting a position using the received PS signals, GPS signal including main frame data and the main frame data of one cycle further including "m" pieces of sub-frame data consisting of first sub-frame data to m-th sub-frame data transmitted from the satellite in a time series manner, which apparatus comprises a battery for supplying power, a receiving unit for receiving GPS signal in an operation mode and for ceasing receiving GPS signal in an inoperative mode, the receiving unit, when kept in the operation mode, being supplied with power from the battery, and the receiving unit, when kept in the inoperative mode, being supplied with no power from the battery, an operation control unit for switching the receiving unit from the inoperative mode to the operation mode, and for switching the receiving unit from the operation mode to the inoperative mode, a judging unit for judging whether or not all the "m" pieces of sub-frame data have been acquired by the receiving unit, when the receiving unit is switched from the inoperative mode to the operation mode by the operation control unit, a time calculating unit for, when the judging unit determines that all the "m" pieces of sub-frame data have not been acquired, calculating a time at which the receiving unit is to be intermittently switched from the inoperative mode to the operation mode in synchronization with transmission of the sub-frame data which has not been acquired by the receiving unit, and for instructing the operation control unit to control operation of the receiving unit based on the calculated time, and a position calculating unit for, when the judging unit determines that all the "m" pieces of sub-frame data have been acquired, calculating a current position of the apparatus using positional information included in the acquired "m" pieces of sub-frame data.

According to another aspect of the invention, there is provided a method of detecting a position using GPS signals transmitted from satellites, GPS signal including main frame data and main frame data of one cycle further including "m" pieces of sub-frame data consisting of from first sub-frame data to m-th sub-frame data transmitted from the satellite in a time series manner, which method comprises step A of switching a receiving unit from an inoperative mode to an operation mode and switching the receiving unit from the operation mode to the inoperative mode, the receiving unit being arranged to be supplied with power from a battery in the operation mode to receive GPS signal and to be supplied with no power from the battery in the inoperative mode to cease receiving GPS signal, step B of judging whether or not all the "m" pieces of sub-frame data have been acquired by the receiving unit, when the receiving unit is switched from the inoperative mode to the operation mode at step A, and when it is determined at step B that all the "m" pieces of sub-frame data have not been acquired, step C of calculating a time at which the receiving unit is to be intermittently switched from the inoperative mode to the operation mode in synchronization with transmission of the sub-frame data which has not acquired by the receiving unit, and instructing the receiving unit to operate based on the calculated time, and step D of calculating a current position using positional information included in the acquired "m" pieces of sub-frame data, when it is determined at step B that all the "m" pieces of sub-frame data have been acquired.

According to still another aspect of the invention, there is provided a position detecting apparatus which comprises a power source for supplying power from a battery, a receiving unit for receiving GPS signal transmitted from a satellite in an operation mode and ceasing receiving GPS signal transmitted from the satellite in an inoperative mode, the receiving unit being supplied with power from the power source in the operation mode and being supplied with no power from the power source in the inoperative mode, an operation control unit for intermittently switching the receiving unit from the inoperative mode to the operation mode, and a judging unit for acquiring a part of "n" pieces of particular data from GPS signal received by the receiving unit which is switched into the operation mode by the operation control unit, the "n" pieces of particular data consisting of first data to n-th data transmitted from the satellite in a time series manner, and acquiring the remaining pieces of particular data when the receiving unit is switched into the operation mode at other timing, and for judging positional information based on the acquired "n" pieces of particular data.

According to yet another aspect of the invention, there is provided a method of detecting a position which comprises step A of receiving GPS signal transmitted from a satellite in an operation mode and ceasing receiving GPS signal transmitted from the satellite in an inoperative mode, in the operation mode power being supplied from a power source including a battery and in the inoperative mode no power being supplied from the power source, step B of switching intermittently from the inoperative mode to the operation mode, and step C of acquiring a part of "n" pieces of particular data from GPS signal received when the inoperative mode is switched to the operation mode at step B, the "n" pieces of particular data including first data to n-th data transmitted from the satellite in a time series manner, and acquiring the remaining pieces of particular data when the inoperative mode is switched to the operation mode at other timing, and judging positional information based on the acquired "n" pieces of particular data.

BRIEF DESCRIPTION OF THE DRAWINGS

FIG. 3 is a flow chart of position detecting operation executed by CPU in the embodiment of the invention.

FIG. 13 is a view showing transition in voltage drop of a coin type battery during a period from the start of positioning operation to the end of its positioning operation.

FIG. 14 is a block diagram illustrating a circuit configuration of a conventional position detecting apparatus.

DETAILED DESCRIPTION OF THE PREFERRED EMBODIMENTS

Now, embodiments of a position detecting apparatus and a method of detecting a position according to the present invention will be described in detail with reference to the accompanying drawings. Note that the embodiments are given as examples to put the present invention into use, and by no means restrict the scope of the present invention. Various modifications may be made to the embodiments of the invention described hereinafter by a person skilled in the art, as long as they fall within the scope of the invention.

Figure 1:
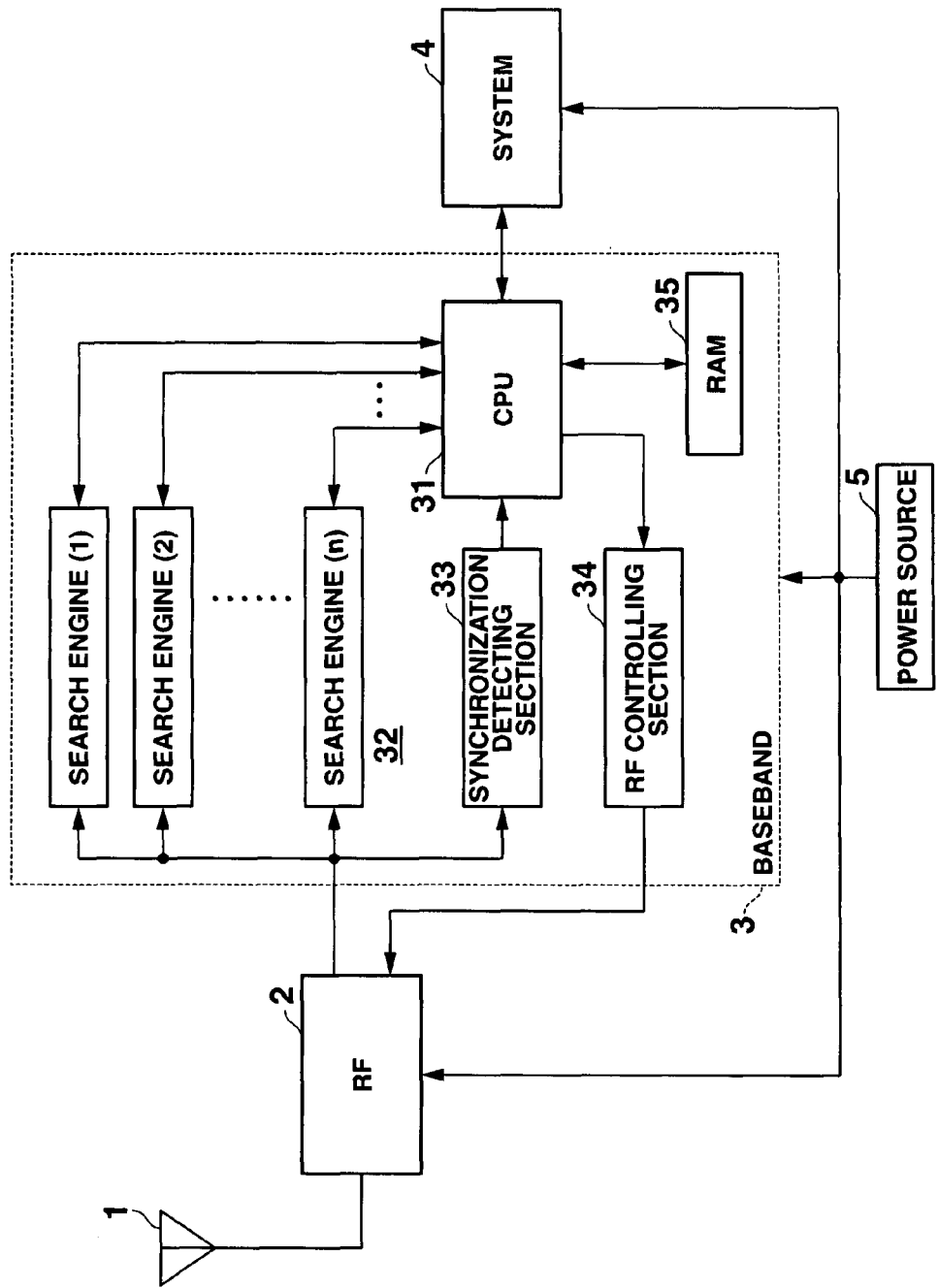
FIG. 1 is a block diagram illustrating a circuit configuration of an embodiment of a position detecting apparatus according to the present invention.

FIG. 1 is a block diagram illustrating a circuit configuration of an embodiment of the position detecting apparatus according to the present invention. The position detecting apparatus of the invention comprises an antenna 1, RF section 2, base band processing section 3, system section 4, and a power source 5, as shown in FIG. 1.

The antenna 1 receives electromagnetic waves transmitted from satellites and inputs the same to RF section 2. RF section 2 extracts and demodulates only GPS (Global Positioning System) signal from the received electromagnetic wave. Further, RF section 2 amplifies the demodulated GPS signal (analog signal) to a necessary level, and converts the analog signal into a base band signal (digital signal) and supplies the base band signal to the base band processing section 3. The base band processing section 3 comprises CPU 31, "n" units of search engines 32, synchronization detecting section 33, RF controlling section 34 and RAM 35. The synchronization detecting section 3 detects a preamble locating at the leading portion of each of sub-frames included in a main frame signal sent from the satellite, thereby inputting a timing of the sub-frame to CPU 31. Responding to an instruction from the system section 4 to acquire GPS signal, CPU 31 instructs RF controlling section 34 to switch RF section 2 into operation mode from inoperative mode, and simultaneously starts up the "n" units of search engines 32. Each search engine 32 acquires one sub-frame and discriminates the satellite and the sub-frame number of such sub-frame based on the acquired sub-frame, and stores the discriminated satellite and the sub-frame number of the sub-frame in a memory (not shown). CPU 31 stores in RAM 35 and manages the discriminated satellite and the sub-frame number of the sub-frame stored in each of the "n" units of search engines 32. More specifically, CPU 31 manages or confirms whether or not, for example, all the five sub-frames (from first sub-frame to fifth sub-frame) transmitted from each of a certain number of satellites (for example, four satellites) have been acquired. Responding to a command from CPU 31, RF controlling section 34 brings RF section 2 into the operation mode or inoperative mode. In the operation mode, a clock of RF section 2 is brought into an enabling state, whereby RF section 2 is made to execute a signal process. Meanwhile, in the inoperative state, the clock of RF section 2 is brought to a disabling state, whereby RF section 2 is made to cease the signal process. Note that RF controlling section is not always composed of a unique hardware system set forth above. The system section 4 comprises, for example, a time counting device, which displays a current position and a current time detected by the base band processing section 3. The power source 5 comprises a small sized battery of a coin type (for example, Battery type 2016) and DC/DC converter, and supplies power to RF section 2, base band processing section 3 and system section 4. In the inoperative mode, FR section does not execute the signal process, consuming no power.

Figures 2A, 2B:
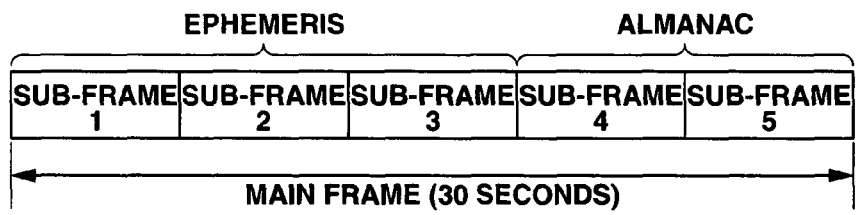
FIGS. 2A and 2B are views each illustrating a frame structure of GPS signal.

FIG. 2 is a view illustrating a signal structure of GPS signal including sub-frames. FIG. 2A is a view illustrating one of main frame signals which are transferred from 32 satellites every 30 second. Each main frame signal includes five sub-frames (sub-frame 1 to sub-frame 5 in FIG. 2A). The sub-frame 1 to sub-frame 3 consist of data (referred to as "ephemeris") unique to each satellite, and the sub-frame 4 and sub-frame 5 consist of data (referred to as "almanac") common to 32 satellites which transmit GPS signals respectively in synchronization with each other. When all the five sub-frames have been received, positional information corresponding to the satellite is acquired. To detect the current position of the apparatus, it is necessary to acquire the positional information corresponding to four satellites (at least three satellites). Therefore, 20 sub-frames are acquired in total. But in the position detecting apparatus of the present invention, five continuous sub-frames sent simultaneously from each satellite are acquired separately.

FIG. 2B is a view illustrating sub-frames each consisting of 300 bits and having a period of 6 seconds. In general, each sub-frame includes TLM (Telemetry) data of 30 bits at the leading portion, and HOW (Handover Word) data of 30 bits next to TLM data. Further, the sub-frame 1 includes clock data of 240 bits and condition data of satellite following TLM data and HOW data. The sub-frames 2, 3 include Ephemeris data such as detailed orbit information unique to each satellite. The sub-frames 4 and 5 include Almanac data such as general orbit information common to 32 satellites and modified ionosphere information. Although not shown in FIG. 2B, the first 8 bits (10001011) of TLM data constitute a preamble pattern, which serves as a synchronizing signal indicating the start of the sub-frame.

As described above, the sub-frames in the GPS signals of 32 satellites are sent in synchronization with each other, and therefore, once TLM data in an arbitrary sub-frame of an arbitrary satellite has been acquired, the satellite which sends such arbitrary sub-frame can be specified and the sub-frame number of such arbitrary sub-frame can be recognized among five sub-frames. Further, a timing of sending other arbitrary sub-frame can be calculated based on TLM data contained in the acquired sub-frame. In the position detecting apparatus of the present invention, the current position is detected utilizing these featuring configurations of the sub-frames.

Figure 4:
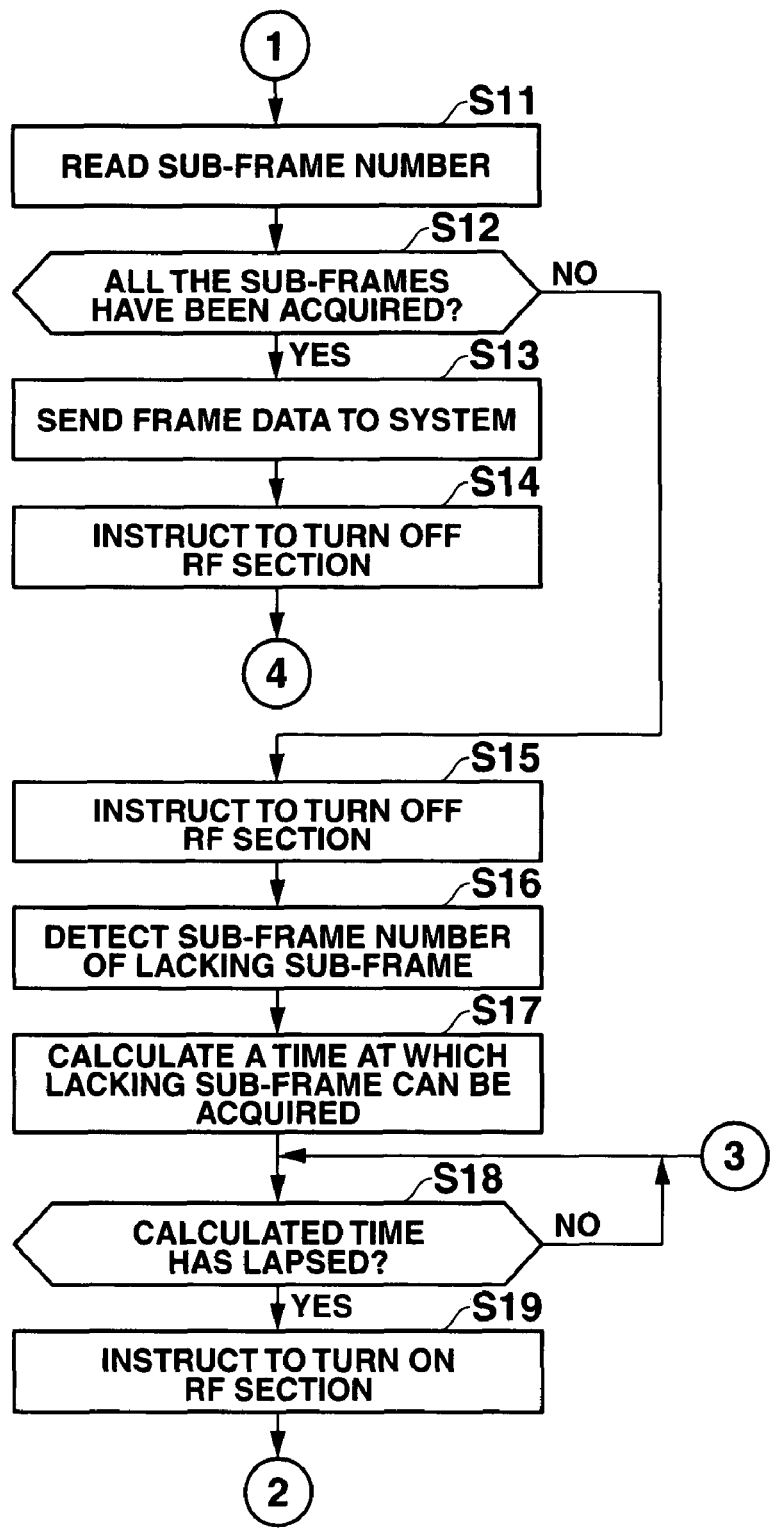
FIG. 4 is a flow chart following the flow chart in FIG. 3.
Figure 5:
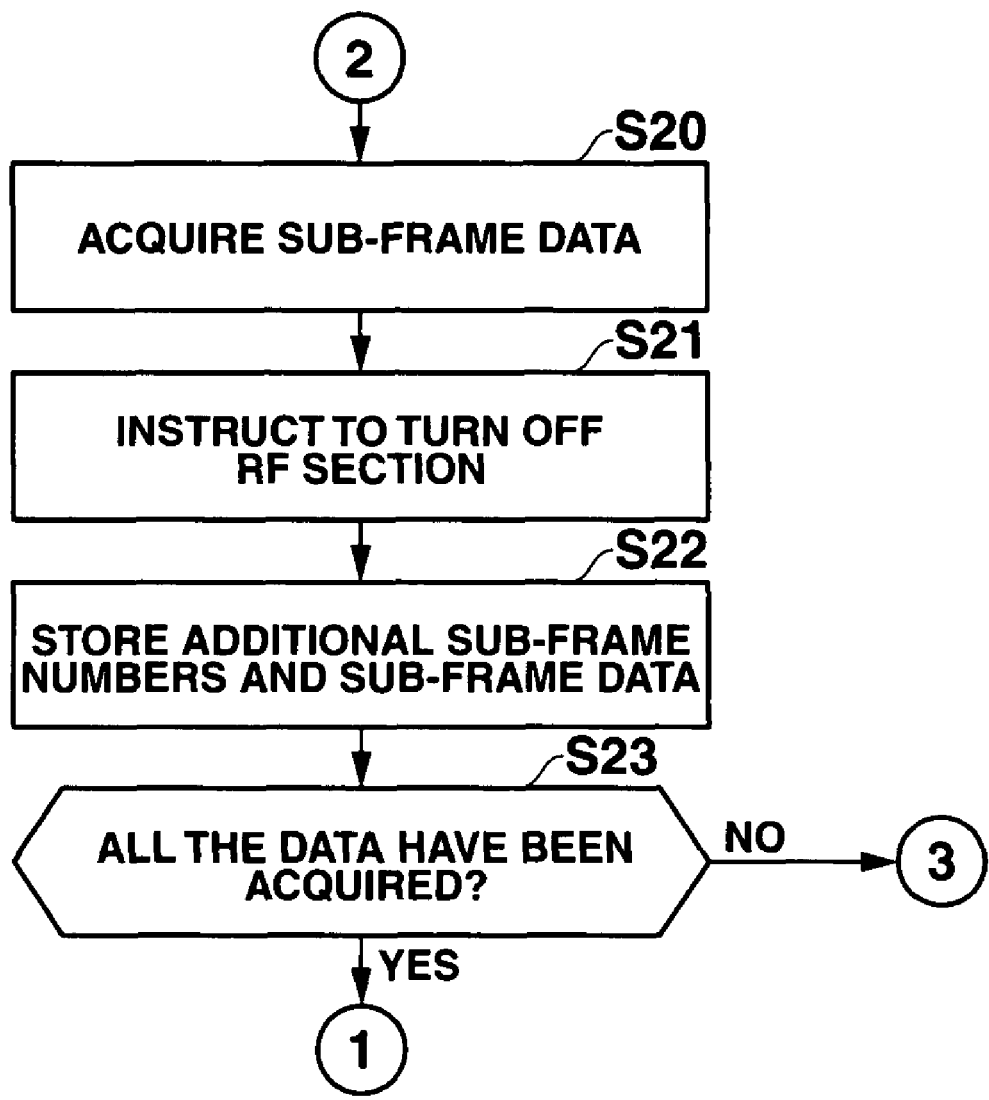
FIG. 5 is a flow chart following the flow chart in FIG. 4.

FIGS. 3 to 5 are flowcharts of a method for detecting a position in the first embodiment of the position detecting apparatus.

CPU 31 executes an initialization process at step S1 in FIG. 3, and then judges at step S2 whether or not the system section 4 has issued an instruction to acquire GPS signal. When it is determined that the instruction to acquire GPS signal has been issued, CPU 31 gives RF controlling section 34 an ON-instruction at step S3, thereby switching RF section 2 from the inoperative mode to the operation mode for a period for receiving five sub-frames sent in a time-series manner, that is, for a period of 30 seconds, in which one piece of main frame data can be received.

Having switched RF section 2 to the operation mode, CPU 31 judges at step S4 whether or not the synchronization detecting section 33 determines that synchronization has been established, that is, CPU 31 judges whether or not the synchronization detecting section 33 has detected the preamble of 8 bits locating at the leading portion of each sub-frame. When the synchronization detecting section 33 has not detected the preamble of the sub-frame (NO at step S4), CPU 31 judges at step S5 whether or not a certain time has lapsed since RF section 2 received the ON-instruction. When it is determined that the certain time has lapsed (YES at step S5), operation returns to step S2, where CPU 31 judges again whether or not the system section 4 has issued an instruction to acquire GPS signal. When it is determined that the certain time has not lapsed (NO at step S5), CPU 31 judges again at step S4 whether or not the synchronization detecting section 33 determines that synchronization has been established. The preamble locating at the leading portion of each sub-frame is sent from each satellite every six seconds, and therefore, the certain time is set at least to six seconds for receiving one piece of sub-frame data.

When the synchronization detecting section 33 determines that synchronization has been established (YES at step 4), CPU 31 stores a synchronization timing in RAM 35 at step S6, and makes the search engines 32 start acquiring data at step S7. Having acquired frame data at step S8, CPU 31 stores the sub-frame numbers of the sub-frames and sub-frame data in RAM 35 at step S9, and judges at step S10 whether or not the period of the main frame of 30 seconds has lapsed since the synchronization establishment is detected. When the period of 30 seconds has not lapsed (NO at step S10), the processes at steps S8 through S10 are repeatedly executed.

When the period of 30 seconds has lapsed (YES at step S10), CPU 31 reads the sub-frame numbers stored in RAM 35 at step S11 in FIG. 4, and judges at step S12 whether or not all the five sub-frame numbers have been read from RAM 35. When it is determined that all the five sub-frame numbers have been read from RAM 35 (YES at step S12), CPU 31 sends frame data stored in RAM 35 to the system section 4 at step S13, and then instructs RF controlling section 34 at step S14 to bring RF section 2 into the inoperative mode. When signal receiving condition is good, and five pieces of sub-frame data have been acquired at one time, CPU 31 returns to step S2 in FIG. 3 to judge whether or no the system section 4 has issued an instruction to acquire GPS signal.

Meanwhile, when it is determined that all the five sub-frame numbers have not been read from RAM 35 (NO at step S12), CPU 31 instructs RF controlling section 34 at step S15 to bring RF section 2 into the inoperative mode, and then detects the sub-frame number of the sub-frame that has not been acquired at step S16. Based on the timing of the synchronization establishment, CPU 31 calculates, at step S17, a next timing at which such sub-frame data that has not been acquired can be acquired. CPU 31 judges at step S18 whether or not such timing has been reached. When it is determined that such timing has been reached (YES at step S19), CPU 31 instructs RF controlling section 34 to switch RF section 2 to the operation mode at step S19. When plural and discontinuous sub-frames have not been acquired, plural and discontinuous time periods are calculated for switching RF section 2 from the inoperative mode to operation mode, thereby acquiring lacking sub-frames as will be described later with reference to FIG. 6A.

Thereafter, CPU 31 acquires the sub-frame data to be received from RF section 2 at step S20 in FIG. 5, and instructs RF controlling section 34 to turn RF section off at step S21, and stores the sub-frame numbers and sub-frame data in RAM 35 at step 22. Further, CPU 31 judges at step S23 whether or not data has been acquired in every calculated time periods. When it is determined that data has not been acquired in every calculated time periods (NO at step S23), CPU 31 returns to step S18 in FIG. 4 to repeatedly execute the processes at steps 18 to 23. When it is determined that data has been acquired in every calculated time periods (YES at step S23), CPU 31 returns to step S2 in FIG. 3 to judge whether or not the system section 4 has issued an instruction to acquire GPS signal.

Figure 6A:
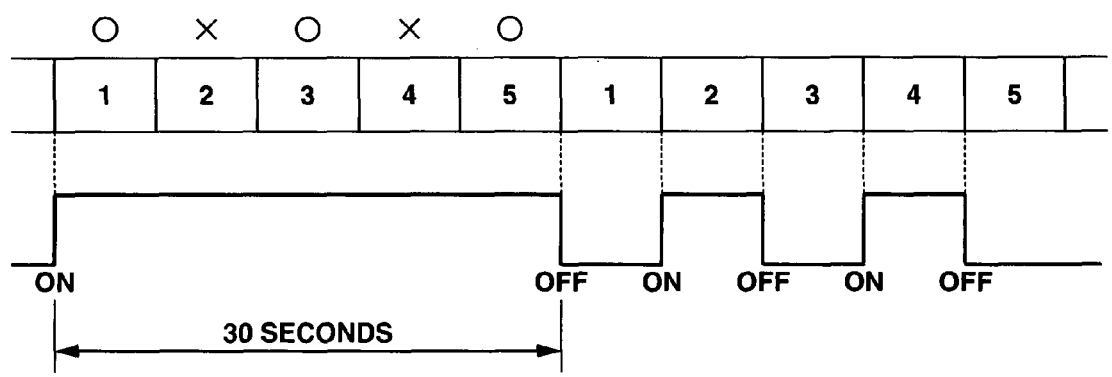
FIG. 6 is a timing chart showing by way of example a switching timing at which RF section is switched from an inoperative mode to an operation mode.
Figure 6B:
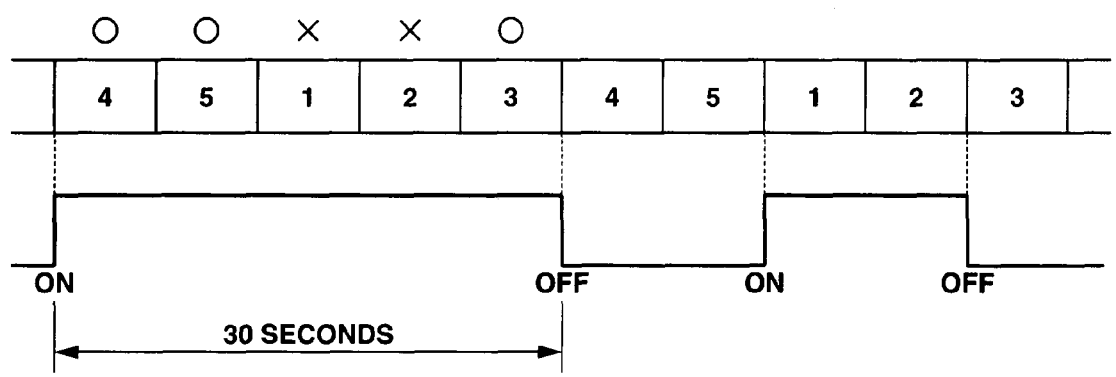

FIG. 6A is a view illustrating a switching timing at which RF section 2 is switched from the inoperative mode to the operation mode. More specifically, FIG. 6A illustrates the case where RF section 2 is kept turned on for a period of 30 seconds after synchronization establishment of the first sub-frames has been detected, that is, RF section 2 detects the sub-frame data but fails to acquire the second and fourth sub-frames during the period of 30 seconds after the preamble of the first sub-frame is detected. Therefore, the following time periods are calculated, during which RF section 2 is turned on to acquire the lacking second and fourth sub-frames. In this case, RF section is switched twice from the inoperative mode to the operation mode. FIG. 6B illustrates the case where RF section 2 is kept turned on for a period of 30 seconds after synchronization establishment of the forth sub-frame was detected, that is, RF section 2 detects the sub-frame data, but fails to acquire the first and second sub-frames during the period of 30 seconds after the preamble of the fourth sub-frame was detected. Therefore, the following time periods are calculated, during which RF section 2 is turned on to acquire the lacking first and second sub-frames. In this case, RF section is switched once from the inoperative mode to the operation mode.

As described above, in the first embodiment of the position detecting apparatus, RF section 2 receives GPS signal including the main frame data in the operation mode during which power is supplied from the battery, and ceases receiving GPS signal in the inoperative mode during which power is not supplied from the battery. This GPS signal includes main frame data, one cycle of which further includes m pieces of sub-frame data including the first sub-frame data to m-th sub-frame data transmitted in a time series manner from the satellite.

CPU 31 instructs RF controlling section 34 to control switching operation of RF section 2 from the inoperative mode to the operation mode and switching operation from the operation mode to the inoperative mode. When RF section 2 is switched from the inoperative mode to the operation mode, CPU 31 judges whether or not RF section 2 has acquired all the five pieces of sub-frame data. When all the five pieces of sub-frame data has not been acquired, a timing is calculated for intermittently switching RF section 2 from the inoperative mode to the operation mode to acquire the lacking sub-frame data. Then, CPU 31 judges again whether or not RF section 2 has acquired all the five pieces of sub-frame data. When it is determined that all the five pieces of sub-frame data have been acquired, CPU 31 calculates the current position using positional information included in the acquired five pieces of sub-frame data.

Therefore, even though a battery of a coin type or other small sized battery is used in the power source 5 in the present apparatus, useless power consumption can be avoided, inviting no abrupt voltage drop in the battery. Therefore, breakdown due to the abrupt voltage drop can be avoided in the apparatus, allowing the same to steadily receive GPS signals from the satellites and to calculate the current position of the apparatus.

In the position detecting apparatus according to the first embodiment, "n" units of search engines 32 are provided, and the sub-frame data of the satellites sequentially acquired from among GPS signals received by RF section 2 are stored in the search engines assigned in correspondence with identification information or TLM data of the appropriate satellites. When five pieces of sub-frame data each of three or four satellites are stores in three or four units of search engines, CPU 31 calculates the current position using positional information included in five pieces of sub-frame data stored in the search engines.

Therefore, for example, when arbitrary sub-frame data are acquired successively from among 20 pieces of sub-frame data consisting of five pieces of sub-frame data of four satellites, a time period during which RF section 2 is kept turned on is shortened. As a result, even though a battery of a coin type or other small sized battery is used in the power source in the present apparatus, useless power consumption can be avoided, inviting no abrupt voltage drop in the battery. Therefore, breakdown due to the abrupt voltage drop can be avoided in the apparatus, allowing the same to steadily receive GPS signals from the satellites and to calculate the current position.

Further, in the position detecting apparatus according to the first embodiment, when acquiring the sub-frame data for the first time, CPU 31 detects the synchronizing signal or preamble locating at the leading portion of arbitrary k-th sub-frame data, where $1 \leq k \leq 5$. Then, CPU 31 switches RF section 2 from the inoperative mode to the operation mode for a period of 30 seconds, which corresponds to one cycle period of a main frame, and tries to acquire five pieces of sub-frame data. When having failed in acquiring some sub-frame data, CPU 31 intermittently switches RF section 2 to the operation mode, and can acquire such lacking sub-frame data in the following cycle.

Therefore, when signal receiving conditions are good and all the five pieces of sub-frame data are acquired in the first cycle, there is no need to intermittently switch RF section 2 to the operation mode and useless power consumption can be avoided.

Furthermore, in the position detecting apparatus according to the first embodiment, when acquiring the sub-frame data for the first time, and failing in detecting the preamble at the leading portion of an arbitrary sub-frame after a predetermined time has lapsed since RF section 2 was switched from the inoperative mode to the operation mode, CPU 31 switches RF section 2 from the operation mode to the inoperative mode.

Therefore, when signal receiving conditions are poor, useless power consumption can be avoided.

Figure 7:
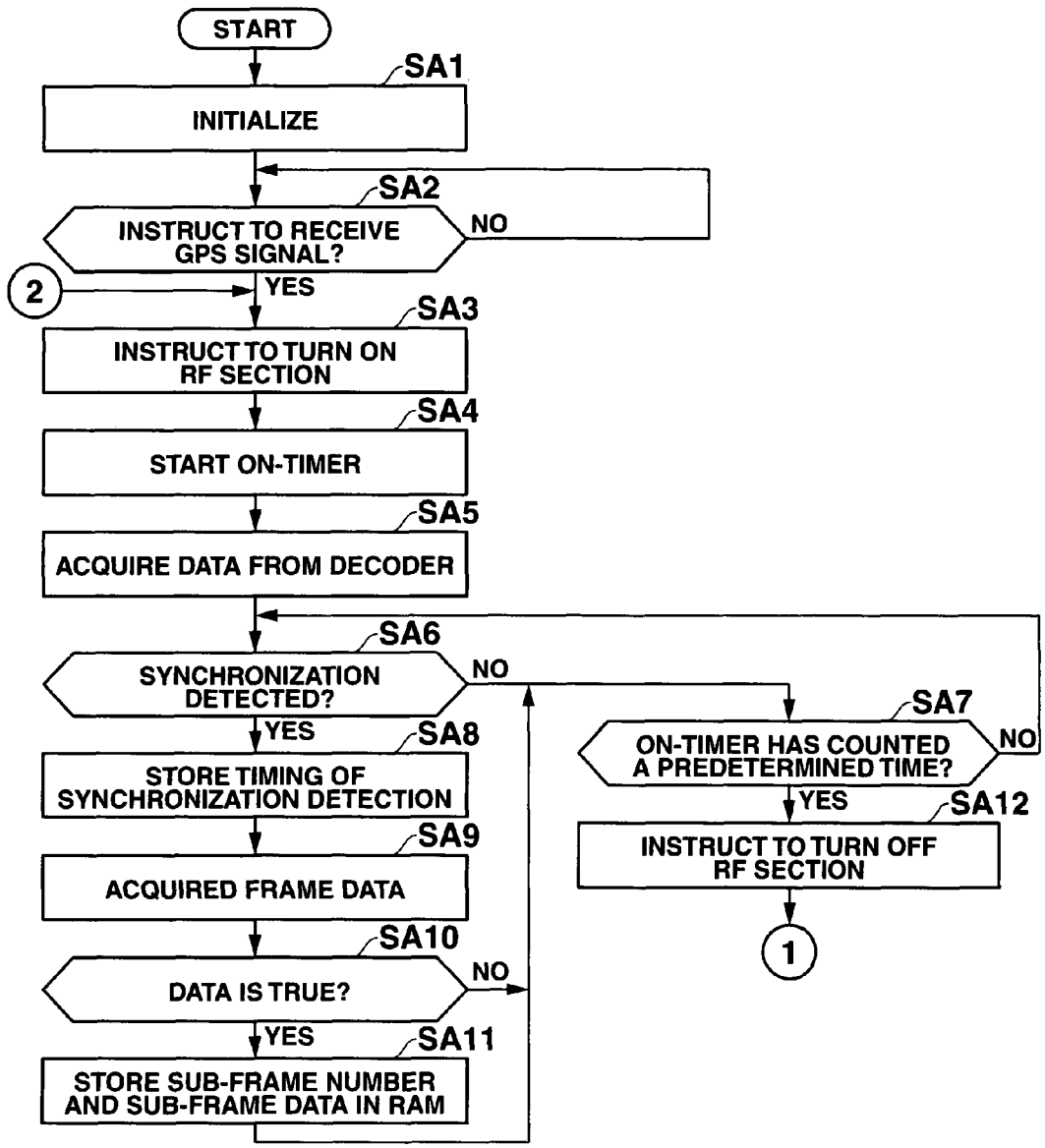
FIG. 7 is a flow chart of position detecting operation executed by CPU in the second embodiment of the invention.
Figure 8:
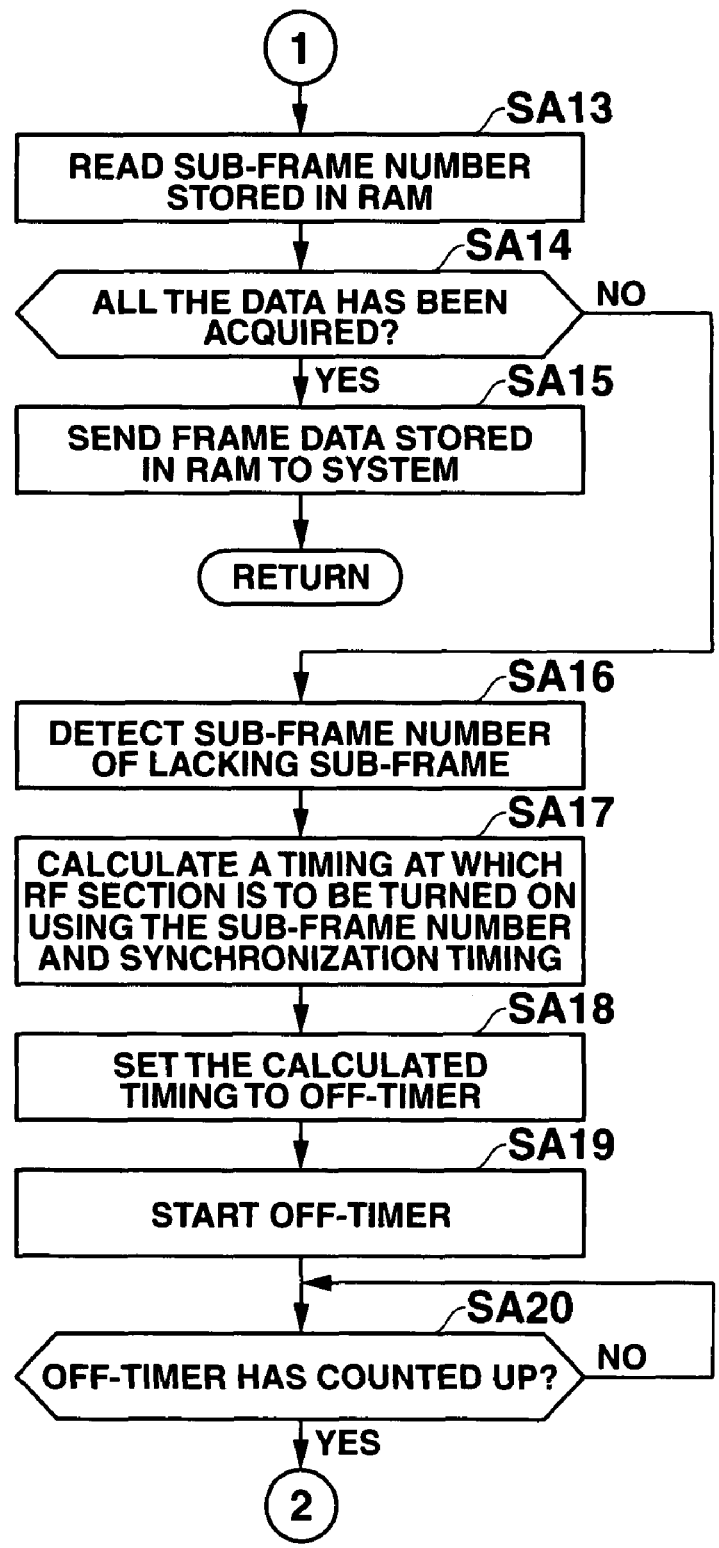
FIG. 8 is a flow chart following the flow chart in FIG. 7.

FIGS. 7 and 8 are flow charts of a method for detecting a position in the second embodiment of the present invention.

CPU 31 executes a predetermined initialization process at step SA1 in FIG. 7, and refers to data stored in RAM 35 and determines at step SA2 whether to issue an instruction to acquire GPS signal. When issuing an instruction to acquire GPS signal, CPU 31 instructs RF controlling section 34 to turn on RF section 2 at step SA3. Responding to the instruction, RF controlling section 34 switches RF section 2 from the inoperative mode to the operation mode. CPU 31 makes a built-in on-timer start at step SA4, and acquires data from a decoder section of the search engine 32 at step SA5.

Then, CPU 31 judges at step SA6 whether or not the synchronization detecting section 33 has detected synchronization establishment, that is, CPU 31 judges whether or not the synchronization detecting section 33 has detected a preamble pattern of 8 bits (10001011) included in TLM. When the synchronization detecting section 33 has not detected the preamble pattern (NO at step SA6), CPU 31 judges at step SA7 whether or not the on-timer has counted up a predetermined time. In the second embodiment, the predetermined time is set to 20 seconds. When the on-timer has not yet counted up the predetermined time (NO at step SA7), CPU 31 judges again at step SA6 whether or not the synchronization detecting section 33 has detected the preamble pattern. When the synchronization detecting section 33 has detected the preamble pattern (YES at step SA6), CPU 31 stores in RAM 35 the timing at which synchronization detecting section 33 has detected the preamble pattern (or a timing at which TLM starts) at step SA8. Then, CPU 31 acquires sub-frame data at step SA9, and judges at step SA10 whether or not the acquired sub-frame data is true. When the signal receiving condition is poor and C (carrier)/N (noises) is low, it is hard to acquire true sub-frame data, and therefore it is necessary to judges whether the acquired data is true or not.

When it is determined that the acquired sub-frame data is true (YES at step SA10), CPU 31 stores in RAM 35 the sub-frame number of the acquired sub-frame and the sub-frame data (satellite identification information, positional information, and the like) at step SA11. After CPU 31 has stored the data in RAM 35 at step SA11, or when CPU 31 determines that the acquired sub-frame data is not true (NO at step SA10), or when the preamble pattern of sub-frame (or synchronization establishment of sub-frames) has not been detected (NO at step SA6), CPU 31 judges again at step SA7 whether or not the on-timer has counted the predetermined time. When the on-timer has not yet counted up the predetermined time (NO at step SA7), CPU 31 judges again at step SA6 whether or not the synchronization detecting section 33 has detected the preamble pattern of the following sub-frame (synchronization establishment of the following sub-frame). When the on-timer has counted up the predetermined time (YES at step SA7), CPU 31 instructs RF controlling section 34 to turn off RF section 2 at step SA12. Note that, at the initial stage, where no sub-frame is stored in RAM 35 at all, CPU 31 instructs RF controlling section 34 to turn off RF section 2 after RF section 2 is kept in the operation mode of about 6 seconds, before the on-timer has counted up the predetermined time of 20 seconds.

Thereafter, CPU 31 reads the sub-frame numbers stored in RAM 35 at step SA13 in FIG. 8, and judges at step SA14 whether or not all the five pieces of sub-frames transmitted from each of four satellites have been acquired. When all the five pieces of sub-frames of each satellite have been acquired (YES at step SA14), CPU 31 sends the sub-frame data stored in RAM 35 to the system section 4 at step SA15. In other words, CPU 31 sends the system section 4 the current position and the current time calculated using data from four satellites, thereby displaying the current position and the current time on the system section 4.

Meanwhile, when it is determined that all the five pieces of sub-frames of each satellite have not yet been acquired (NO at step SA14), CPU 31 detects the sub-frame number of the lacking sub-frame at step SA16 in FIG. 8. CPU 31 calculates, at step SA17, a next timing at which RF section is turned on, using the detected number of the sub-frame and the timing at which synchronization establishment has been detected. Then, CPU 31 sets the calculated timing to an off-timer at step SA18, and makes the off-timer start at step SA19, and then judges whether or not the off-timer has counted up the preset time at step SA20. When the off-timer has counted up the preset time (YES at step SA20), CPU 31 returns to step SA3 in FIG. 7, where CPU 31 instructs RF controlling section to turn on RF section 34. Thereafter, CPU 31 repeatedly executes a loop process (from step SA3 to step SA12 in FIG. 7, and step SA16 to step SA20 in FIG. 8) until it is determined that all the five pieces of sub-frames of each satellite have been acquired (YES at step SA14).

Figures 12A, 12B:
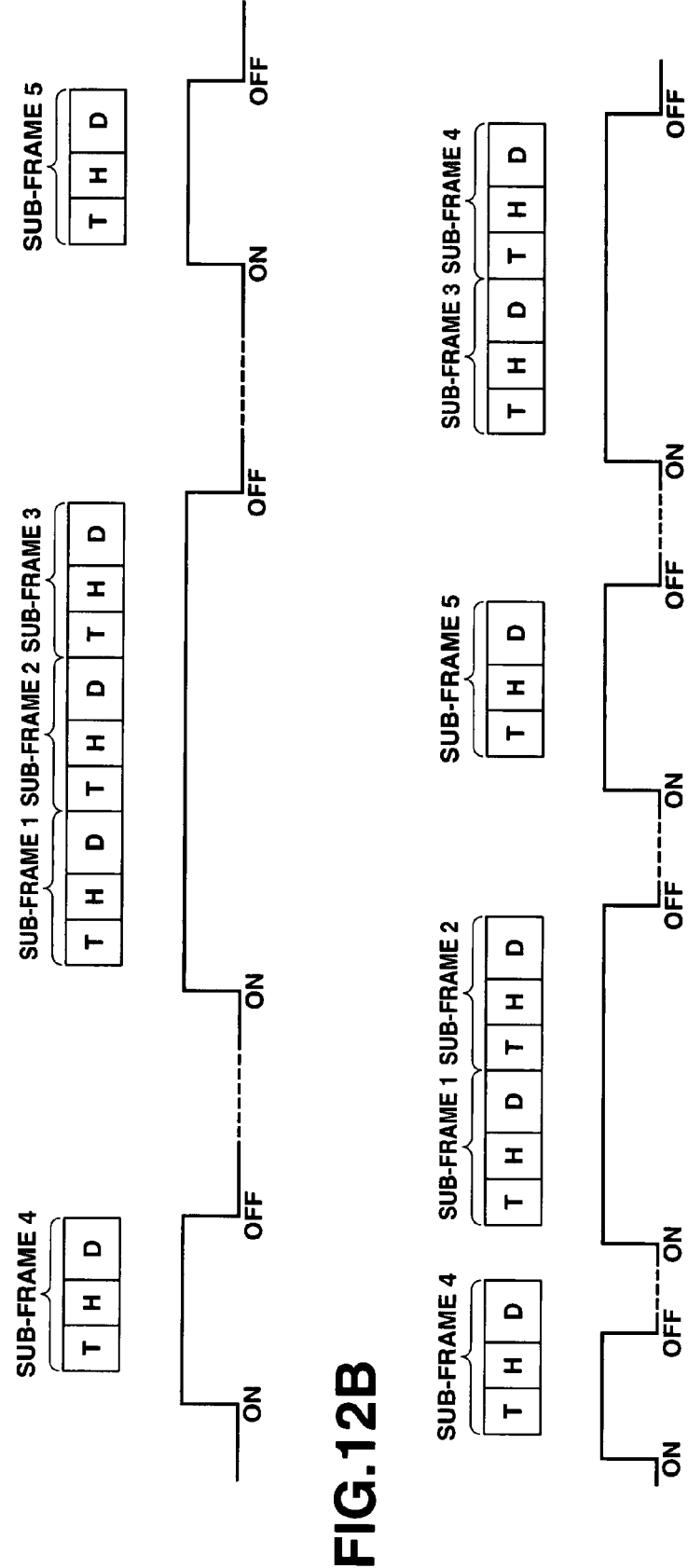
FIG. 12A is a timing chart showing by way of example sub-frame acquiring operation in the second embodiment of the invention.
FIG. 12B is a timing chart showing by way of example sub-frame acquiring operation in the third embodiment of the invention.

FIG. 12A is a timing chart illustrating an example of a process for acquiring sub-frames in the second embodiment of the present invention. In FIG. 12A, T denotes TLM, H denotes HOW, and D denotes Ephemeris or Almanac (including parity bits) for simplicity. In the example shown in FIG. 12A, a sub-frame 4 is acquired for the first time. Since the main frame is sent every 30 seconds, when the start time of the preamble of TLM included in the sub-frame 4 is stored in RAM 35 as the timing at which synchronization has been detected, the preamble of TLM included in the sub-frame 1 is sent every time when 12 seconds, 42 seconds, and 72 seconds lapse after such timing, that is, at the time when T=(12+30× m: m=0, 1, 2, . . . ) seconds lapse after such timing. Therefore, if a timing of "T−α" is set to the off-timer with a margin time of "α" set for steady receiving operation, the sub-frame 1 can be received without failure when the off-timer has counted up the preset time, and RF section is turned on. In the example shown in FIG. 12A, a period for the operation mode, that is, time set to the on-timer is "18+α". In this case, three sub-frames from the sub-frame 1 to sub-frame 3 can be acquired. A sub-frame 5 remains to be acquired thereafter. Therefore, RF section 2 is switched to the operation mode at time when "6−α" seconds or "36−α" seconds lapse after the start time of the preamble of the sub-frame 3, whereby the remaining sub-frame 5 is acquired.

As described above, in the second embodiment of the present invention, RF section 2 consumes less power in the inoperative mode but consumes much power in the operation mode. RF section 2 is intermittently switched from the inoperative mode to the operation mode and is kept in the operation mode for a short period. RF section 2 in the operation mode acquires a part of five pieces of sub-frame data consisting of the first sub-frame data to fifth sub-frame data transmitted in a time series manner from the satellites. When switched to the operation mode at other timing, RF section 2 acquires the remaining sub-frame data. CPU 31 evaluates positional information using five pieces of sub-frame data acquired in the above mentioned manner.

Therefore, in the position detecting apparatus of the present invention, even though a battery of a coin type or other small sized battery is used as the power source, breakdown of the apparatus is not invited due to the abrupt voltage drop of the battery, and GPS signals of the satellites can be received steadily, whereby the current position is detected without failure.

Figure 9:
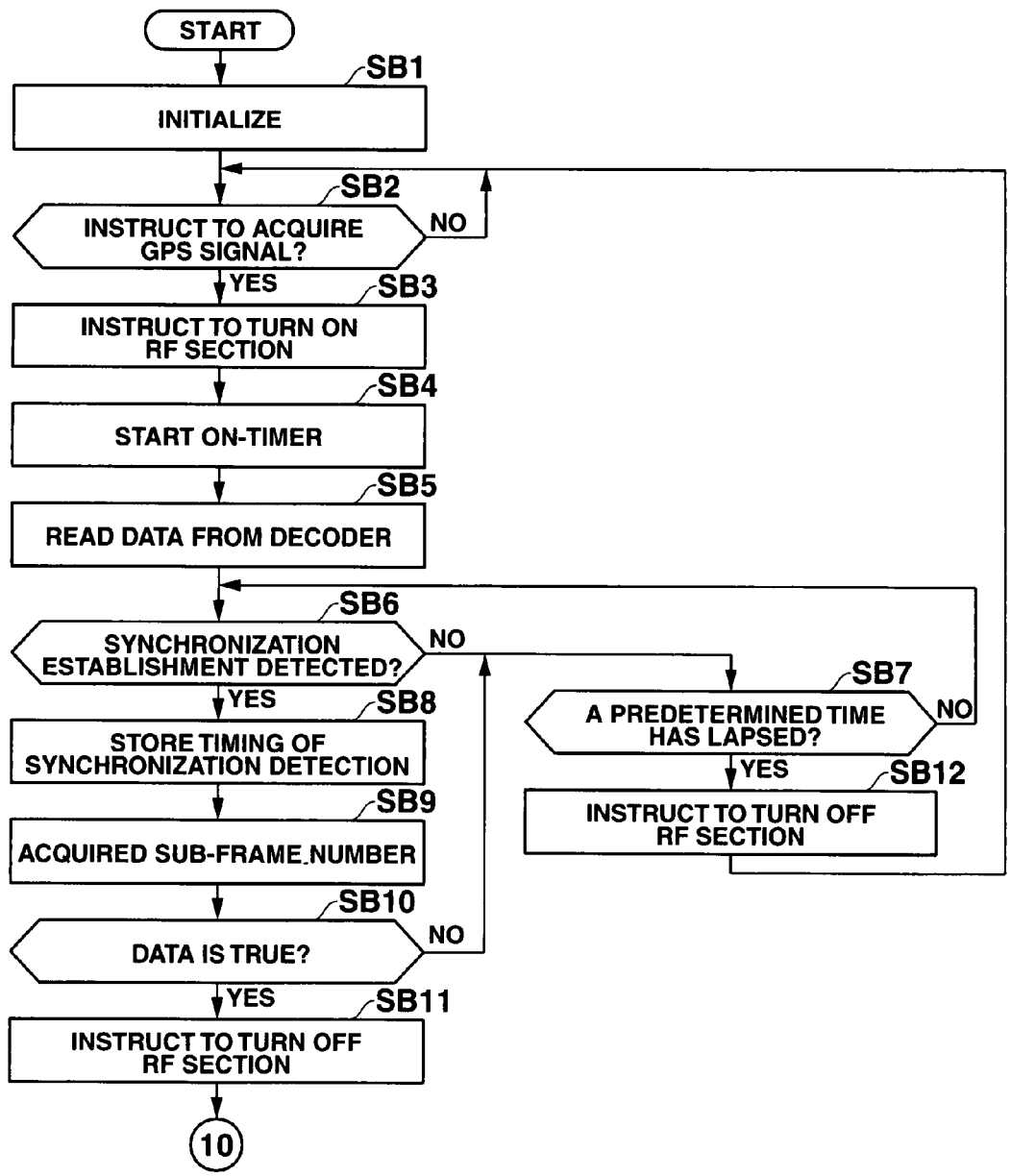
FIG. 9 is a flow chart of position detecting operation executed by CPU in the third embodiment of the invention.
Figure 10:
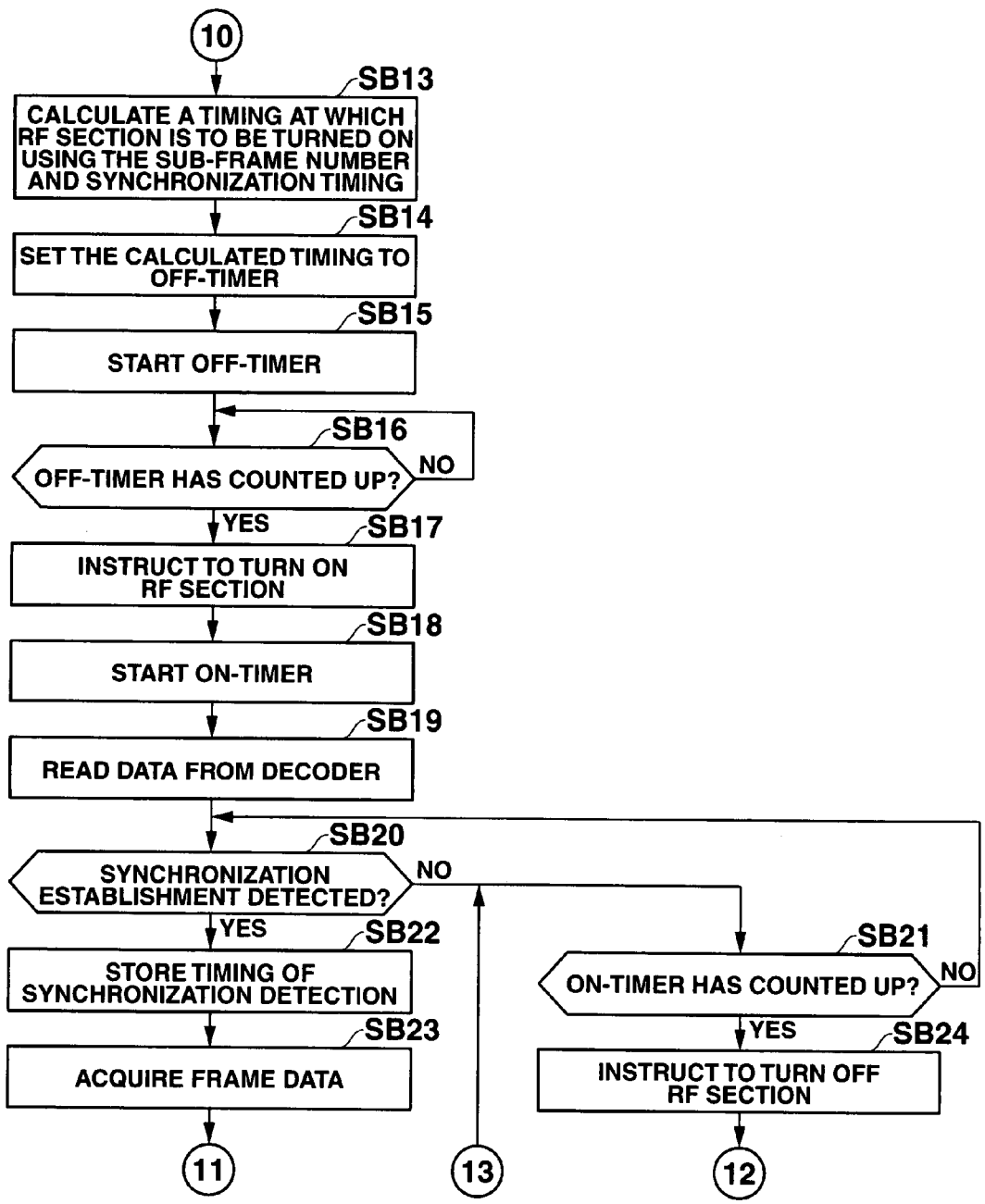
FIG. 10 is a flow chart following the flow chart in FIG. 9.
Figure 11:
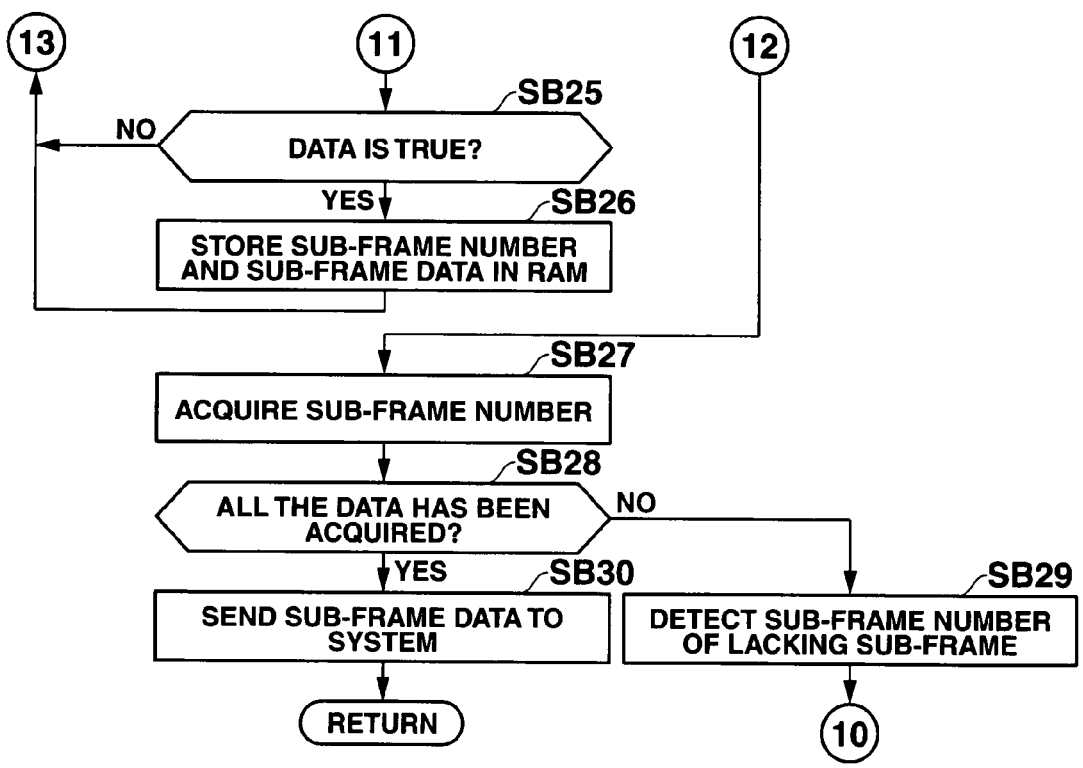
FIG. 11 is a flow chart following the flow chart in FIG. 10.

FIGS. 9 to 11 are flow charts of a method for detecting a position according to the third embodiment of the present invention.

CPU 31 executes a predetermined initialization process at step SB1 in FIG. 9, and then refers to data stored in RAM 35, and judges whether to issue an instruction to acquire GPS signals at step SB2. When instructing to acquire GPS signals, CPU 31 instructs RF controlling section 34 to turn on RF section 2 at step SB3. Responding to the instruction, RF controlling section 34 switches RF section 2 from the inoperative mode to the operation mode. CPU 31 starts the built-in on-timer at step SB4, and reads data from the decoder sections of the search engines 32 at step SB5.

Further, CPU 31 judges at step SB6 whether or not synchronization establishment has been detected, that is, CPU 31 judges whether or not the synchronization detecting section 33 has detected the preamble pattern of 8 bits (10001011) included in TLM. When the synchronization establishment has not yet been detected (NO at step SB6), CPU 31 judges at step SB7 whether or not the on-timer has counted a predetermined time. In this case, the predetermined time is set to 20 seconds. When the on-timer has not counted up the predetermined time (NO at step SB7), CPU 31 judges again at step SB6 whether or not the synchronization establishment has been detected. When the synchronization establishment has been detected (YES at step SB6), CPU 31 stores the timing of the synchronization establishment (start time of TLM) in RAM 35 at step SB8. Then, CPU 31 acquires the sub-frame number at step SB9, and judges at step SB10 whether or not the acquired sub-frame number is true. In the case where the signal receiving condition is poor and C (carrier)/N (noises) is low, it is hard to acquire true sub-frame data, and therefore it is necessary to judges whether the acquired number of the sub-frame is true or not. In the first embodiment, in the initial stage where no sub-frame is stored in RAM 35, a piece of sub-frame data is acquired and subjected to the judgment. In the second embodiment, only the sub-frame number included in HOW of the sub-frame is acquired for judgment, but data of Ephemeris and Almanac is not acquired for judgment. Therefore, in the initial stage, RF section 2 is switched to and kept in the operation mode only for a period of 1.2 seconds to acquire data, which period corresponds to the period of TLM and HOW. For example, when RF section 2 is switched from the inoperative mode to the operation mode about 0.8 seconds prior to the start of the preamble of TLM, RF section 2 will be kept in the operation mode for a period of about 2 seconds.

When it is determined that the acquired number of the sub-frame is true (YES at step SB10), CPU 31 instructs RF controlling section 34 to turn off RF section 2 at step SB11. When it is determined that the acquired number of the sub-frame is not true (NO at step SB10), or when the synchronization establishment of the sub-frame has not been detected (NO at step SB6), CPU 31 judges at step SB7 whether or not the on-timer has counted up the predetermined time. When the on-timer has not yet counted up the predetermined time (NO at step SB7), CPU 31 judges again at step SB6 whether or not the synchronization detecting section 33 has detected the synchronization establishment of the following sub-frame. When the on-timer has counted up the predetermined time (YES at step SB7), CPU 31 instructs RF controlling section 34 to turn off RF section 2 at step SB12.

Thereafter, CPU 31 calculates at step SB13 a timing at which RF section is turned on again, based on the detected number of the sub-frame and the timing at which the synchronization establishment has been detected. Then, CPU 31 sets the calculated timing to the off-timer at step SB14, and starts the off-timer at step SB15. Further, CPU 31 judges at step SB16 whether or not the off-timer has counted up the preset time. When the off-timer has counted up the preset time (YES at step SB16), CPU 31 instructs RF controlling section 34 to turn on RF section 2 at step SB17. CPU 31 starts the on-timer at step SB18, and obtains data from the decoder sections of search engines at step SB19.

CPU 31 judges at step SB20 whether or not the synchronization detecting section 33 has detected synchronization establishment, that is, CPU 31 judges whether or not the synchronization detecting section 33 has detected the preamble pattern of TLM. When the synchronization detecting section 33 has not detected the synchronization establishment (NO at step SB20), CPU 31 judges at step SB21 whether or not the on-timer has counted up. When the on-timer has not counted up the preset time (NO at step SB21), CPU 31 judges again at step SB20 whether or not the synchronization detecting section 33 has detected synchronization establishment. Meanwhile, when the synchronization detecting section 33 has detected synchronization establishment (YES at step SB20), CPU 31 stores in RAM 35 the timing (start time of TLM) at which the synchronization establishment has been detected at step SB22, and acquires sub-frame data at step SB23. When the on-timer has counted up the preset time (YES at step SB21), CPU 31 instructs RF controlling section 34 to turn off RF section 2 at step SB24.

Having acquired the sub-frame data at step SB23, CPU 31 judges whether the acquired data is true or not at step SB25 in FIG. 11. When the acquired data is true (YES at step SB25), CPU 31 stores in RAM 35 the sub-frame number of the acquired sub-frame and positional information of the sub-frame at step SB26. When data has been stored in RAM 35 at step SB26, or when it is determined that the data is not true (NO at step SB 25), CPU 31 judges at step SB21 in FIG. 10 whether the on-timer has counted up or not.

After having instructed RF controlling section 34 to turn on RF section 2 at step SB24 in FIG. 10, CPU 31 acquires the sub-frame numbers stored in RAM 35 at step SB27 in FIG. 11, thereby further judging at step SB28 whether or not all the five sub-frames transmitted from each of four satellites have been acquired. When all the five sub-frames from each of four satellites have not been acquired (NO at step SB28), CPU 31 detects the sub-frame number of the lacking sub-frame that has not been stored in RAM 35 at step SB29. Then, CPU 31 calculates at step SB13 in FIG. 10 a timing at which RF section is to be turned on, based on the sub-frame number of the lacking sub-frame and the timing of the synchronization establishment. Thereafter, CPU 31 instructs RF controlling section 34 to intermittently switch RF section 2 from the inoperative mode to the operation mode to acquire the lacking sub-frames until all the five sub-frames of each satellite will have been acquired. When it is determined that all the five sub-frames of each of five satellites have been acquired (YES at step SB28), CPU 31 sends the sub-frame data stored in RAM 35 to the system section 4 at step SB30. In other words, CPU 31 calculates the current position and the current time using data from five satellites, and sends them to the system section 4, thereby displaying the current position and the current time thereon.

FIG. 12B is a timing chart illustrating an example of a process for acquiring sub-frames in the third embodiment of the present invention. In FIG. 12B, the sub-frame 4 denotes a sub-frame which has been acquired at the beginning. As illustrated in FIG. 12B, only TLM and HOW of the sub-frame 4 are acquired but Almanac data of the sub-frame 4 is not acquired. That is, when signal receiving conditions are poor, RF section 2 is turned on only for a short time of about 2 seconds. CPU 31 stores in RAM 35 only the start time of the preamble of TLM (that is, the timing at which synchronization is detected) and the sub-frame number of the sub-frame 4 included in HOW. For example, when a time of "12−α" seconds is set to the off-timer, with a margin time "α" set for steadily receiving GPS signals into consideration, a sub-frame 1 will have been acquired when RF section 2 is turned on and the off-timer has counted up, as shown in FIG. 12B. If a time of "12+α" seconds is set to the on-timer, a sub-frame 2 will be acquired. Thereafter, a sub-frame 5 is acquired during the next operation mode, and further a sub-frame 3 and sub-frame 4 are acquired during the following operation mode, as shown in FIG. 12B.

Note that TLM and HOW are not always extracted from the first acquired sub-frame as shown in FIG. 12B. In the case the signal receiving conditions are poor, FR section 2 is turned on only for a short period of about 2 seconds thereby acquiring TLM and HOW, even though three or four sub-frames have been acquired.

In the third embodiment of the invention described above, RF section 2 consumes less power during the inoperative mode and on the contrary consumes much power during the operation mode. The RF section 2 is intermittently switched from the inoperative mode to the operation mode to acquire GPS signals. RF section 2 acquires a part of five pieces of sub-frame data (the fist sub-frame to fifth sub-frame) transmitted in time series manner from GPS signals of satellites, and further acquires remaining pieces of sub-frame data in other operation mode. CPU 31 judges positional information based on the acquired five pieces of sub-frame data.

Therefore, in the third embodiment of the invention, even though a battery of a coin type or other small sized battery is used as the power source, breakdown of the apparatus is not invited due to the abrupt voltage drop of the battery, and RF section 2 is intermittently switched from the inoperative mode to the operation mode at timings depending on the signal receiving conditions, and therefore, GPS signals of the satellites can be received steadily, whereby the current position is detected without failure.

In the third embodiment of the invention, only TLM and HOW of the first acquired sub-frame are obtained. Modification may be made to the third embodiment, such that only the start time of the preamble of a sub-frame is obtained first and such start time of the preamble is stored in RAM 35 as a timing at which synchronization is detected. In other words, even in the case where TLM and HOW of an arbitrary sub-frame can not be acquired due to poor signal receiving conditions but only the preamble of the sub-frame is acquired, the time at which RF section 2 is to be switched to the operation mode is set depending on the signal receiving conditions. RF section 2 is switched to the operation mode at such timing and acquires the sub-frame data (from the sub-frame 1 to the sub-frame 5) transmitted from the satellites, since the same sub-frame data is sent again from the satellite 30 seconds after the timing of the synchronization detection, even though the sub-frame number of the sub-frame is not known. The current position can be calculated depending on the acquired sub-frame data without failure.

As described above, in the modification made to the third embodiment, even though a battery of a coin type or other small sized battery is used as the power source, breakdown of the apparatus is not invited due to the abrupt voltage drop of the battery, and GPS signals of the satellites can be received steadily, whereby the current position is detected without failure.

FIG. 13 is a view showing transition in voltage drop (discharge characteristic) of a battery during a period from the start of positioning operation of the position detecting apparatus to the end of its positioning operation, when a battery of a coin type or other small sized battery is used as the power source in the position detecting apparatus. After RF controlling section 34 starts the positing operation at a time of t1, RF section 2 consumes power and the voltage of the battery drops as time lapses during the positing operation as shown in FIG. 13. When RF controlling section 34 stops the positing operation at a time of t2, the battery voltage returns to the original voltage. But when the positing operation continues in a conventional apparatus until five sub-frames have been acquired, the voltage can drop lower than a critical value and the voltage of the battery can not return to the original voltage, although depending on variety of characteristics of the battery, whereby operation of the apparatus can be shut down. Otherwise, it needs a long time to recover the original voltage of the battery, and the apparatus remains in break down state until the battery recovers the original voltage.

A new coin type battery (model 2016) is used at a temperature of minus 10 degrees C. The result teaches that when the operation mode from the time when RF section is turned on to the time when RF section is turned off is set to 60 seconds, the positing operation can repeatedly be executed four times. Meanwhile, when the operation mode is set to 20 seconds, the positing operation can repeatedly be executed 66 times. Therefore, when the operation mode is set to 20 seconds, a set of positioning operations executed continuously for three time may be executed 22 times. When compared with the case where the operation mode is set to 60 seconds to execute positing operation four times, the battery can be used effectively by 5.5 times.

What is claimed is:

1. A position detecting apparatus for receiving GPS signals transmitted from satellites, and for detecting a position using the received PS signals, GPS signal including main frame data and the main frame data of one cycle further including "m" pieces of sub-frame data consisting of first sub-frame data to m-th sub-frame data transmitted from the satellite in a time series manner, the apparatus comprising:
    a power source for supplying power from a battery;
    a receiving unit for receiving GPS signal in an operation mode and for ceasing receiving GPS signal in an inoperative mode, the receiving unit, when kept in the operation mode, being supplied with power from the power source, and the receiving unit, when kept in the inoperative mode, being supplied with no power from the power source;
    an operation control unit for switching the receiving unit from the inoperative mode to the operation mode, and for switching the receiving unit from the operation mode to the inoperative mode;
    a judging unit for judging whether or not all the "m" pieces of sub-frame data have been acquired by the receiving unit, when the receiving unit is switched from the inoperative mode to the operation mode by the operation control unit;
    a time calculating unit for, when the judging unit determines that all the "m" pieces of sub-frame data have not been acquired, calculating a time at which the receiving unit is to be intermittently switched from the inoperative mode to the operation mode in synchronization with transmission of the sub-frame data which has not been acquired by the receiving unit, and for instructing the operation control unit to control operation of the receiving unit based on the calculated time; and
    a position calculating unit for, when the judging unit determines that all the "m" pieces of sub-frame data have been acquired, calculating a current position of the apparatus using positional information included in the acquired "m" pieces of sub-frame data.

2. The position detecting apparatus according to claim 1, further comprising:
    plural storing units for storing sub-frame data, wherein the position calculating unit stores sub-frame data acquired successively from GPS signal received from a satellite by the receiving unit in the storing unit assigned to the satellite based on identifying information of such satellite, and calculates the current position of the apparatus using positional information contained in the "m" pieces of sub-frame data stored in the storing units, when appropriate "m" pieces of sub-frame data are stored in a predetermined number of storing units.

3. The position detecting apparatus according to claim 1, wherein the operation control unit keeps the receiving unit in the operation mode for a period equivalent to one cycle of the main frame data from a time when a leading synchronizing signal of k-th sub-frame data is detected, where $1 \leq \text{"k"} \leq \text{"m"}$, before receiving an instruction from the time calculating unit to control operation of the receiving unit based on the calculated time.

4. The position detecting apparatus according to claim 3, wherein the judging unit instructs the operation control unit to switch the receiving unit from the inoperative mode to the operation mode, when the leading synchronizing signal of arbitrary sub-frame data has not been detected since a certain period of time lapses after the receiving unit was switched from the inoperative mode to the operation mode by the operation control unit.

5. A method of detecting a position using GPS signals transmitted from satellites, GPS signal including main frame data and main frame data of one cycle further including "m" pieces of sub-frame data consisting of from first sub-frame data to m-th sub-frame data transmitted from the satellite in a time series manner, the method comprising:
    step A of switching a receiving unit from an inoperative mode to an operation mode and switching the receiving unit from the operation mode to the inoperative mode, the receiving unit being arranged to be supplied with power from a battery in the operation mode to receive GPS signal and to be supplied with no power from the battery in the inoperative mode to cease receiving GPS signal;
    step B of judging whether or not all the "m" pieces of sub-frame data have been acquired by the receiving unit, when the receiving unit is switched from the inoperative mode to the operation mode at step A;
    when it is determined at step B that all the "m" pieces of sub-frame data have not been acquired, step C of calculating a time at which the receiving unit is to be intermittently switched from the inoperative mode to the operation mode in synchronization with transmission of the sub-frame data which has not acquired by the receiving unit, and instructing the receiving unit to operate based on the calculated time; and
    step D of calculating a current position using positional information included in the acquired "m" pieces of sub-frame data, when it is determined at step B that all the "m" pieces of sub-frame data have been acquired.

6. The method of detecting a position according to claim 5, wherein, in step D, sub-frame data acquired successively from GPS signal received from a satellite by the receiving unit is stored in a storing unit that is assigned to the satellite based on identifying information of such satellite, and the current position is calculated using positional information contained in the "m" pieces of sub-frame data of plural satellites stored respectively in plural storing units, when appropriate "m"

pieces of sub-frame data are stored in a predetermined number of storing units assigned respectively to plural satellites.

7. The method of detecting a position according to claim 5, wherein, in step A, the receiving unit is kept in the operation mode for a period equivalent to one cycle of the main frame data from a time when a leading synchronizing signal of k-th sub-frame data is detected, where $1 \leq \text{"k"} \leq \text{"m"}$, before an instruction is given at step C to control operation of the receiving unit based on the calculated time.

8. The method of detecting a position according to claim 7, wherein, in step B, an instruction is given to switch the receiving unit from the inoperative mode to the operation mode at step A, when the leading synchronizing signal of arbitrary sub-frame data has not been detected since a certain period of time lapses after the receiving unit was switched from the inoperative mode to the operation mode at step A.

9. A position detecting apparatus comprising:
a power source for supplying power from a battery;
a receiving unit for receiving GPS signal transmitted from a satellite in an operation mode and ceasing receiving GPS signal transmitted from the satellite in an inoperative mode, the receiving unit being supplied with power from the power source in the operation mode and being supplied with no power from the power source in the inoperative mode;
an operation control unit for intermittently switching the receiving unit from the inoperative mode to the operation mode; and
a judging unit for acquiring a part of "n" pieces of particular data from GPS signal received by the receiving unit which is switched into the operation mode by the operation control unit, the "n" pieces of particular data consisting of first data to n-th data transmitted from the satellite in a time series manner, and acquiring the remaining pieces of particular data when the receiving unit is switched into the operation mode at other timing, and for judging positional information based on the acquired "n" pieces of particular data.

10. The position detecting apparatus according to claim 9, further comprising:
"n" units of storing units corresponding respectively to "n" pieces of particular data consisting of the first data to "n"-th data transmitted from the satellite in a time series manner, wherein the judging unit stores the particular data acquired from GPS signal received by the receiving unit sequentially in the appropriate storing units, and judges positional information, when the particular data are stored in all the "n" units of appropriate storing units.

11. The position detecting apparatus according to claim 9, wherein the operation control unit calculates a time at which the receiving unit is switched next time from the inoperative mode to the operation mode, when arbitrary "m"-th particular data, where $1 \leq \text{"m"} \leq \text{"n"}$, is received by the receiving unit at the last time in the operation mode.

12. The position detecting apparatus according to claim 9, wherein the operation control unit controls the operation mode, in which the receiving unit can receive at least one "m"-th particular data, where $1 \leq \text{"m"} \leq \text{"n"}$, among plural pieces of particular data included in GPS signal.

13. The position detecting apparatus according to claim 9, wherein the "n" pieces of particular data consisting of the first data to "n"-th data transmitted from the satellite in a time series manner are equivalent respectively to the first to fifth sub-frame data.

14. A method of detecting a position comprising:
step A of receiving GPS signal transmitted from a satellite in an operation mode and ceasing receiving GPS signal transmitted from the satellite in an inoperative mode, in the operation mode power being supplied from a power source including a battery and in the inoperative mode no power being supplied from the power source;
step B of switching intermittently from the inoperative mode to the operation mode; and
step C of acquiring a part of "n" pieces of particular data from GPS signal received when the inoperative mode is switched to the operation mode at step B, the "n" pieces of particular data including first data to n-th data transmitted from the satellite in a time series manner, and acquiring the remaining pieces of particular data when the inoperative mode is switched to the operation mode at other timing, and judging positional information based on the acquired "n" pieces of particular data.

15. The method of detecting a position according to claim 14, further comprising:
step D of storing "n" pieces of particular data in "n" units of appropriate storing units respectively, the "n" pieces of particular data including the first data to "n"-th data transmitted from the satellite in a time series manner, wherein, in step D, the particular data acquired from GPS signal received at step A are stored sequentially in the appropriate storing units, and positional information is judged, when the particular data are stored in all the "n" units of appropriate storing units.

16. The method of detecting a position according to claim 14, wherein, in step C, a time is calculated at which the inoperative mode is switched to the operation mode next time, when "m"-th particular data, where $1 \leq \text{"m"} \leq \text{"n"}$, is received at the last time in the operation mode at step A.

17. The method of detecting a position according to claim 14, wherein, in step C, the operation mode is controlled for receiving at least one "m"-th particular data, where $1 \leq \text{"m"} \leq \text{"n"}$, among plural pieces of particular data included in GPS signal.

18. The method of detecting a position according to claim 14, wherein the "n" pieces of particular data including the first data to "n"-th data transmitted from the satellite in a time series manner are equivalent respectively to the first to fifth sub-frame data.

* * * * *